(12) United States Patent
Murthy (10) Patent No.: US 12,001,694 B1
(45) Date of Patent: Jun. 4, 2024

(54) DATA STORAGE SYSTEM CONFIGURATION COMPLIANCE FRAMEWORK

(71) Applicant: Amazon Technologies, Inc., Seattle, WA (US)

(72) Inventor: Mahit Murthy, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 62 days.

(21) Appl. No.: 17/486,773

(22) Filed: Sep. 27, 2021

(51) Int. Cl.
*G06F 12/00* (2006.01)
*G06F 3/06* (2006.01)
*G06F 13/00* (2006.01)

(52) U.S. Cl.
CPC .......... *G06F 3/0631* (2013.01); *G06F 3/0604* (2013.01); *G06F 3/0634* (2013.01); *G06F 3/0659* (2013.01); *G06F 3/067* (2013.01)

(58) Field of Classification Search
CPC ...... G06F 9/45558; G06F 9/542; G06F 16/21; G06F 16/2358; G06F 16/258; G06F 2009/45579; G06F 2009/45587; G06F 2009/45595; G06F 3/0667; G06F 8/60; G06F 8/65; G06F 9/45533
See application file for complete search history.

(56) References Cited

U.S. PATENT DOCUMENTS

2022/0067019 A1* 3/2022 Nakajima ............. G06F 16/258

* cited by examiner

*Primary Examiner* — Yong J Choe
(74) *Attorney, Agent, or Firm* — Davis Wright Tremaine LLP (57) ABSTRACT

Disclosed techniques generate a data structure including data representing a configuration of a data storage system. A parameter can be obtained that is usable to configure the data storage system. Data representing the configuration of the data storage system can be modified based on the parameter. The data storage system can be configured, using the parameter, based on the modified data representing the configuration of the data storage system and predetermined configuration data for the data storage system.

20 Claims, 7 Drawing Sheets

DATA STORAGE SYSTEM CONFIGURATION COMPLIANCE FRAMEWORK

BACKGROUND

As an increasing number of applications and services are made available over networks such as the Internet, content, application, and/or service providers are turning to technologies such as cloud computing. Cloud computing, in general, is an approach to providing access to electronic resources through services, such as Web services, where the hardware and/or software used to support those services are dynamically scalable to meet the needs of the services at any given time. A user or customer typically will rent, lease, or otherwise pay for access to the resources through the cloud, eliminating having to purchase and maintain the hardware and/or software to provide access to these resources.

Data storage can be in the resources and services provided by cloud computing. Performing tasks such as provisioning and scaling data storage can involve manual procedures that use configuration information and requirements applied to computing resources of the data storage. It can be time-consuming and costly to ensure that the configuration information and requirements applied to the computing resources of the data storage are valid and cause the data storage to function properly and as expected.

BRIEF DESCRIPTION OF THE DRAWINGS

Various techniques will be described with reference to the drawings, in which.

DETAILED DESCRIPTION

The present disclosure describes a variety of systems and techniques for reliably configuring a data storage system. The data storage system can be part of a distributed system, such as a distributed system associated with applications and services that are made available over networks such as the Internet. The data storage system can include a data plane and a control plane. The data plane can process data of the data storage system. For example, the data plane can include one or more load balancers, routers, cache, and/or other computing resources, such as computing nodes and storage nodes. The control plane can be used to manage computing resources of the data plane. For example, the control plane can include components (e.g., hardware and software) useful for managing the computing resources of the data plane.

The described systems and techniques provide a proposal-based control plane system for data storage systems. The system can provide a control plane that uses a graph data structure to model computing resources of the data plane (e.g., clusters, availability zones, hosts, replicas, partitions, hash spaces, etc.) and provides relationships between the computing resources of the data plane. The control plane can further include a document or other data structure that provides configuration constraints on the computing resources of the data plane.

The system can provide one or more application programming interfaces (APIs) to request and propose changes to the computing resources of the data plane. The system can process the API requests to update the graph data structure to reflect the proposed changes to the computing resources of the data plane. The graph data structure, incorporating the proposed changes to the computing resources of the data plane, can be compared to the document that provides the configuration constraints on the computing resources of the data plane. If any constraint of the document is violated, the system can reject the proposed changes to the computing resources of the data plane. However, if the configuration constraints in the document are not violated, the system can persist the proposed changes to the computing resources of the data plane. For example, the proposed changes can be applied reliably to the computing resources of the data plane by an agent software executed by one or more systems of the control plane and/or data plane.

The described systems and techniques can provide and/or generate a first data structure that includes configuration data corresponding to a data storage system. The first data structure can be a graph-based data structure, such as a directed acrylic graph (DAG). In another example, the data structure can be a tree-based data structure or a hash map-based data structure. The systems and techniques can provide and/or generate the first data structure that includes configuration data corresponding to the data storage system by analyzing the computing resources of the data storage system.

An API request to update a configuration of the data storage system can be received by the control plane of the data storage system. The API request can identify an operation to update the configuration of the data storage system based on a parameter of the API request. The parameter can identify an instruction to add a host to the data storage system, remove a host from the data storage system, create a cluster in the data storage system, modify a cluster of the data storage system, create or modify an availability zone of the data storage system, create or modify a container (e.g., a replica or backup container) of the data storage system, and so forth. In general, the parameter can identify an instruction to configure or otherwise modify one or more computing resources of the data storage system. The control plane can process the API request by calling the operation identified by the API request. Calling the operation identified by the API request causes the operation to execute and process the parameter. Processing the parameter can cause the operation identified by the API request to modify the configuration data of the first data structure, rather than immediately updating the configuration of the data storage system.

The control plane can use a configuration proposal API to process an associated API call that compares the modified configuration data of the first data structure to a second data structure that includes constraint data for the data storage system. The constraint data included in the second data structure can include rules pertaining to modifying or otherwise changing computing resources of the data storage system. For example, the rules pertaining to modifying or otherwise changing computing resources of the data storage system can include rules specifying the number of hosts that can be included in the data storage system, rules for modifying the hosts of the data storage system, rules for adding hosts to the data storage system, rules for deleting hosts of the data storage system, rules associated with clusters of the data storage system, partitioning rules of the data storage system, rules associated with availability zones of the data storage system, rules associated with replica nodes of the data storage system, rules associated with a hash space and/or a hash chunk space of the data storage system, rules for routers of the data storage system, and so forth.

In an example, the control plane can use the constraint data included in the second data structure to determine when the modified configuration data of the first data structure conflicts with the constraint data of the second data structure. When the modified configuration data conflicts with the constraint data, the control plane can generate a message indicating that the requested changes to the data storage system do not comply with the constraint data included in the second data structure, and the update to the configuration of the data storage system based on the parameter of the API request is disallowed. However, when the modified configuration data does not conflict with the constraint data, the control plane can allow updating the configuration of the data storage system based on the parameter of the API request. In an example, the control plane can use a persist configuration API to update the configuration of the data storage system based on the parameter of the API request to update the data storage system and the operation specified in the API request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
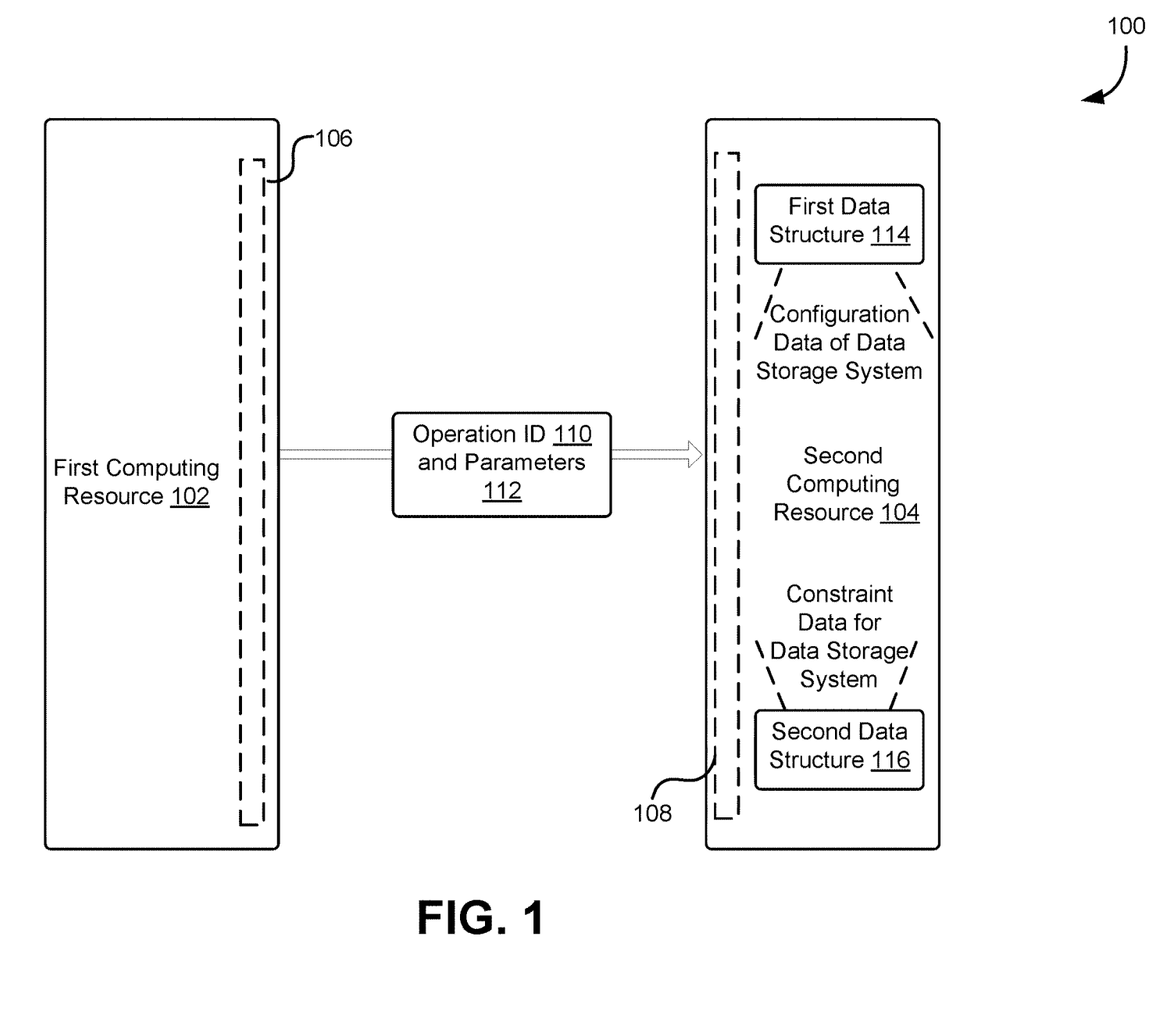
FIG. 1 is a computing system diagram illustrating aspects of an operating environment used to process one or more proposed updates to a data storage system, in accordance with at least one embodiment.

FIG. 1 is a computing system diagram illustrating aspects of an operating environment 100 used to process one or more requested updates to a data storage system, in accordance with at least one embodiment. In at least one embodiment, the operating environment 100 comprises the data storage system. The operating environment 100 can include a first computing resource 102 and a second computing resource 104. In at least one embodiment, one or more of the first computing resource 102 and the second computing resource 104 are associated with a data storage system that includes at least a control plane. In at least one embodiment, the control plane of the data storage system can comprise the first computing resource 102 and the second computing resource 104.

The operating environment 100 can be provided by an online service provider, such as a service provider that offers various computer-implemented services to its customers. The first computing resource 102 and/or the second computing resource 104 can comprise one or more processors and stored computer-executable instructions that are executable by the one or more processors to cause one or more of the acts or actions to verify compliance of updates for the data storage system.

The operating environment 100 can provide an interface 106 that facilitates communication between the first computing resource 102 and the second resource 104. In at least one embodiment, the interface 106 can be a programmatic interface, such as one or more APIs, webpages or websites, graphical user interfaces, and command-line tools. The interface 106 can be used to facilitate the execution of one or more operations based on one or more parameters specified by the first computing resource 102, based on a user's interaction with the first computing resource 102. Furthermore, the operating environment 100 can provide an interface 108 that facilitates processing of communications obtained or received at the second computing resource 104. In at least one embodiment, the interface 108 can be a programmatic interface, such as one or more APIs, webpages or websites, graphical user interfaces, and command-line tools.

An operator or user of the first computing resource 102 can provide an operation identifier 110 and at least one parameter 112, which are communicated to the second computing resource 104 using the interface 106. As indicated in the foregoing, the interface 106 can be an API request that includes the operation identifier 110 and the at least one parameter 112. The operation identifier 110 can be linked to an executable operation hosted by the operating environment 100, such as hosted by the second computing resource 104. The executable operation identified by the operation identifier 110 can be executed to process the at least one parameter.

The at least one parameter 112 can be a parameter to update one or more computing resources of the data storage system. In at least one embodiment, the at least one parameter 112 can be a parameter to update one or more computer resources of a data plane that is managed by a control plane. The data plane can process data of the data storage system. For example, the data plane can include one or more load balancers, routers, cache, and/or other computing resources, such as computing nodes and storage nodes. The control plane can be used to manage computing resources of the data plane. For example, the control plane can include components (e.g., hardware and software) useful for managing the computing resources of the data plane. The at least one parameter 112 can identify an instruction to add a host to the data storage system, remove a host from the data storage system, create a cluster in the data storage system, modify a cluster of the data storage system, create or modify an availability zone of the data storage system, create or modify a container (e.g., a replica or backup container) of the data storage system, and so forth. In general, the parameter 112 can identify an instruction to configure or otherwise modify one or more computing resources of the data storage system.

In at least one embodiment, the second computing resource 104 can comprise, provide, and/or generate a first data structure 114 that includes configuration data corresponding to a data storage system. The first data structure 114 can be a graph-based data structure, such as a DAG. In at least one embodiment, the first data structure 114 can be a tree-based data structure or a hash map-based data structure. The second computing resource 104 can provide and/or generate the first data structure 114 that includes configuration data corresponding to the data storage system by analyzing the computing resources of the data storage system, and based on that analysis, the second computing resource 104 generates the first data structure 114. In at least one embodiment, the first data structure 114 includes configuration data corresponding to computing resources of a data plane. The first data structure 114 can be generated by analyzing the computing resources of the data plane. Based on the analysis, the first data structure 114 generates the first data structure 114 to include the configuration data corresponding to the computing resources of the data plane, where the configuration data includes one or more graph nodes corresponding to computing resources of the data plane.

The second computing resource 104 can comprise a second data structure 116. In at least one embodiment, the second data structure 116 includes constraint data for the data storage system. The constraint data included in the second data structure 116 can include rules pertaining to modifying or otherwise changing computing resources of the data storage system. In at least one embodiment, the constraint data included in the second data structure 116 can include rules pertaining to modifying or otherwise changing computing resources of a data plane associated with the data storage system. For example, the rules pertaining to modifying or otherwise changing computing resources of the data storage system can include rules specifying the number of hosts that can be included in the data storage system, rules for modifying the hosts of the data storage system, rules for adding hosts to the data storage system, rules for deleting hosts of the data storage system, rules associated with clusters of the data storage system, partitioning rules of the data storage system, rules associated with availability zones of the data storage system, rules associated with replica nodes of the data storage system, rules associated with a hash space and/or a hash chunk space of the data storage system, rules for routers of the data storage system, and so forth.

The operation ID 110 and the at least one parameter 112 can be obtained and processed by the interface 108. In at least one embodiment, the interface 108 is a configuration proposal API to process the operation ID 110 and parameter 112. Specifically, the interface 118 can use the operation ID 110 to locate and execute the operation associated with the operation ID 110. Executing the operation causes the operation to process the parameter 112. In at least one embodiment, executing the operation and causing the operation to process the parameter 112 updates the first data structure 114 to include updated configuration data of the data storage system. Specifically, the parameter 112 can update the configuration data of the first data structure 114 to add a host, remove a host, create a cluster, modify a cluster, create or modify an availability zone, create or modify a container (e.g., a replica container), and so forth.

In at least one embodiment, the second computing resource 104 can use the interface 108 call or execute an operation that compares the updated configuration data of the first data structure 114 to a second data structure 116 that includes constraint data for the data storage system. The constraint data included in the second data structure 116 can include rules pertaining to modifying or otherwise changing computing resources of the data storage system, such as a data plane of the data storage system. As indicated in the foregoing, the rules pertaining to modifying or otherwise changing computing resources of the data storage system can include rules specifying the number of hosts that can be included in the data storage system, rules for modifying the hosts of the data storage system, rules for adding hosts to the data storage system, rules for deleting hosts of the data storage system, rules associated with clusters of the data storage system, partitioning rules of the data storage system, rules associated with availability zones of the data storage system, rules associated with replica nodes of the data storage system, rules associated with a hash space and/or a hash chunk space of the data storage system, rules for routers of the data storage system, and so forth.

The second computing resource 104 can use the constraint data included in the second data structure 116 to determine when the updated configuration data of the first data structure 114 conflicts with the constraint data of the second data structure 116. When the updated configuration data conflicts with the constraint data, the second computing resource 104 can reject the update to the configuration of the data storage system associated with the request including the operation identifier 110 and the parameter 112. In at least one embodiment, the updated configuration data of the first data structure 114 is rolled back so that the configuration data of the first data structure 114 no longer includes the configuration data updates caused by processing the one or more parameter 112 associated with the request to update the configuration of the data storage system.

When the modified configuration data does not conflict with the constraint data of the second data structure 116, the second computing resource 104 can allow updating of the configuration of the data storage system, based on the operation identifier 110 and the parameter 112. In an example, the control plane can use a persist configuration programmatic interface, such as an API, to update the configuration of the data storage system based on the parameter 112 and the operation 110. The persist configuration programmatic interface can be part of the interface 108. In at least one embodiment, the updated configuration data of the first data structure 114 is used by the second computing resource 104 to update the configuration of the data storage system.

Figure 2:
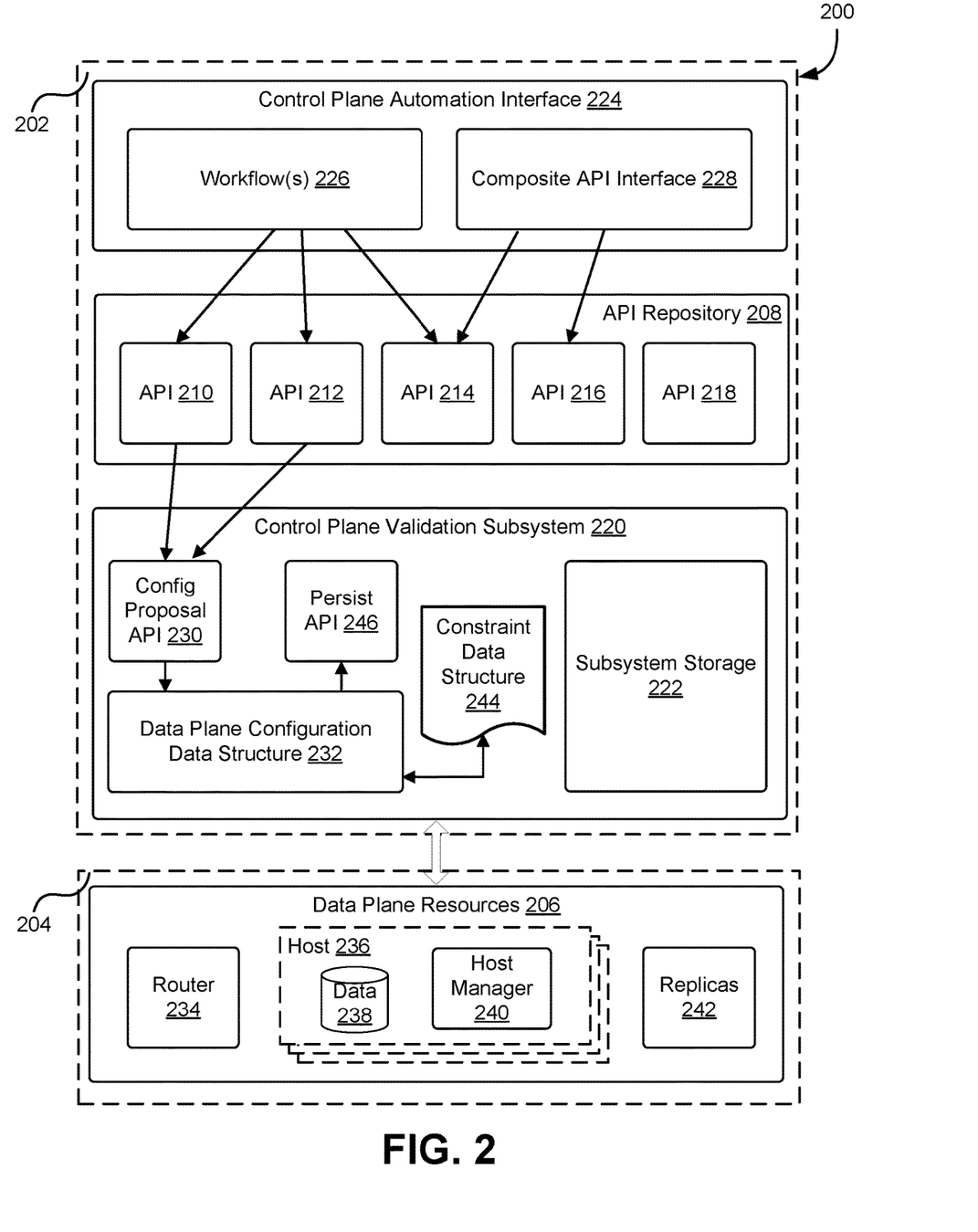
FIG. 2 is a computing system diagram illustrating aspects of an operating environment used to process one or more proposed updates to a data storage system that includes a control plane and a data plane, in accordance with at least one embodiment.

FIG. 2 is a computing system diagram illustrating aspects of an operating environment 200 used to process one or more updates to a data storage system that includes a control plane 202 and a data plane 204, in accordance with at least one embodiment. The operational elements of the operating environment 200, illustrated in FIG. 2, can be implemented and/or realized using computer-implemented software and/or hardware. Thus, the operating environment 200 can comprise one or more processors to execute hosted computer-implemented instructions.

In at least one embodiment, the control plane 202 can be coupled to a client computing device through a network, such as the Internet or other suitable network that can include a private or public facing network of an online service provider. The client computing device can be used by a user, such as a customer or operator, to make calls, such as those associated with one or more API requests, into the control plane 202. These calls can cause the control plane 202 to perform a task, such as to provision computing resources of the data plane 204. In at least one embodiment, the calls can cause a control plane validation subsystem 220 to execute one or more tasks, such as to provision resources of the data plane 204. It should be understood that any appropriate user, application, service, device, component, or resource can access one or more interfaces of the control plane 202 as appropriate in the various described embodiments. Further, while the components of the operating environment 200 are illustrated as being separated into control plane 202 and data plane 204, it should be understood that this can refer to an actual or virtual separation of at least some of resources (e.g., hardware and/or software) used to provide the respective functionality.

In at least one embodiment, the control plane 202 can be a virtual layer of hardware and software components that handles control and management actions, such as provisioning, scaling, replication, etc., for data plane resources 206 of the data plane 204. In at least one embodiment, the control plane 202 can include a Web services layer, or tier, which can include at least one Web server, for example, along with computer-executable instructions, application servers, or other such components. In at least one embodiment, an API repository 208 is associated with such a web services layer. The API repository 208 can include a set of APIs 210-218. Each API of the APIs 210-218 can be provided to allow requests for at least one specific action or operation to be performed with respect to the operating environment 200, such as to provision, modify, update scale, clone, and/or hibernate an instance of one more the data plane resources 206.

One or more of the APIs 210-218 can be associated with the API repository 208 manually by an operator interfacing with the control plane 202. For example, a graphical user interface, such as a Web browser or a computer-implemented application interface, can be used to add or remove APIs included in the API repository 208. In at least one embodiment, one or more of the APIs 210-218 can be associated with the API repository 208 automatically using functionality of the control plane 202 and/or functionality of the environment 200. In at least one embodiment, the API repository 208 and/or the control plane 202 incorporates computer-executable instructions, that when executed by one or more processors, analyzes one or more of a data plane configuration data structure 232 and/or the constraint data structure 244 to automatically generate one or more of the APIs 210-218 of the API repository 208. For example, in at least one embodiment, the API repository 208 and/or the control plane 202 can analyze attributes of one or more nodes and/or vertices of the data plane configuration data structure 232 to generate one or more of the APIs 210-218 of the API repository 208. For example, nodes and/or vertices of the data plane configuration data structure 232 can comprise properties, such as a host ID, replica ID, availability zone ID, relationship information to other nodes in the data structure 232, a region attribute, etc., and these properties can be analyzed by computer-executable instructions of the API repository 208 and/or the control plane 202 to generate the one or more APIs 210-218 of the API repository 208.

The control plane validation subsystem 220 can receive requests associated with one or more of the APIs 210-218. Upon receiving a request associated with one or more of the APIs 210-218, the control plane validation subsystem 220 can parse or otherwise analyze the request to determine the steps, actions, and/or operations needed to act on or process the call. For example, a call can be received by the control plane validation subsystem 220 that includes a request to create a data repository for association with the data plane resources 206. In this example, the control plane validation subsystem 220 can parse the request to determine the type of data repository to be created, the storage volume requested, the type of hardware requested (if any), or other such aspects. Information for the request can be written to a subsystem storage 222, or other appropriate storage location or job queue, for subsequent processing.

The control plane 202 can include a control plane automation interface 224. The control plane automation interface 224 can be used for interfacing with one or more of the APIs 210-218 of the API repository 208. In at least one embodiment, the control plane automation interface 224 includes one or more workflows 226 and a composite API interface 228. The one or more workflows 226 and/or the composite API interface 228 can be used, respectively, to submit API requests to the control plane validation subsystem 220.

A workflow in general is a sequence of predefined tasks that should be executed to perform a specific job. The workflow is not the actual work but an abstraction of the work that controls the flow of information and execution of the work. A workflow also can be thought of as a state machine, which can manage and return the state of a process at any time during execution. A workflow (or system of components) in at least one embodiment is operable to manage and/or perform the hosting and executing of workflows for tasks related to the data plane resources 206 such as: repository creation, updating resources, modifying resources, and deleting resources; recovery and backup; security group creation, deletion, and modification; user credentials management; and key rotation and credential management. Thus, in accordance with at least one embodiment, the one or more workflows 226 can leverage one or more of the APIs 210-218 to submit requests of the control plane validation subsystem 220 for tasks related to the data plane resources 206, such as updating the data plane resources 206, adding or deleting components of the data plane resources 206, and so forth. The composite API interface 228 provides similar functionality as the described workflow. However, the composite API interface 228 can be leveraged by a user or operator of the environment 200 to select one or more of the APIs 210-218 to submit requests to the control plane validation subsystem 220 for tasks related to provisioning, configuring, updating, deleting, etc., the data plane resources 206. Furthermore, in at least one embodiment, the composite API interface 228 can be used to create one or more of the workflows 226. In at least one embodiment, an operator or user can use a client computing device to interface directly with the API repository 208 to select one or more of the APIs 210-218 to submit requests to the control plane validation subsystem 220 for tasks related to provisioning, configuring, updating, deleting, etc., the data plane resources 206.

The control plane validation subsystem 220 can include a configuration proposal API 230. The configuration proposal API 230 can receive requests associated with one or more of the APIs 210-218 of the API repository 208. Specifically, the configuration proposal API 230, in at least one embodiment, can process API requests to alter the data plane resources 206. Each of the one or more requests received by the configuration proposal API 230 can comprise one or more operation identifiers and one or more parameters to be executed by operations identified by the operation identifiers. In at least one embodiment, the operations identified by the operation identifiers can be stored as computer-implemented instructions in the subsystem storage 222.

The configuration proposal API 230 can communicate with the data plane configuration data structure 232. In at least one embodiment, the data plane configuration data structure 232 is generated by analyzing, performed by the control plane validation subsystem 220 for example, a configuration of the resources associated with the data plane 204. In at least one embodiment, the data plane configuration data structure 232 is generated manually by an operator that interfaces with the environment 200 and/or the control plane 202. In at least one embodiment, the configuration data of the data structure 232 represents or identifies the elements of the data plane resources 206. For example, the configuration data of the data structure 232 can represent that the data plane resources 206 include at least a router 234, one or more hosts 236, comprise data 238 and a host manager 240, and at least one replica or backup 242 of the data 238. Furthermore, the configuration data of the data structure 232 can include configuration information associated with some or all of the data plane resources 206. This configuration information can include metadata of the data plane resources 206, such as modification information, creation information, access information, ownership information, and so forth, pertaining to the data plane resources 206. In at least one embodiment, the data plane 204 can include at least one storage cluster topology that includes some or all of the data plane resources 206. The at least one storage cluster topology can be allocated a set of hash addresses. The configuration data of the configuration data structure 232 can be represented as a graph-based data structure, a tree-based data structure, a hash-based data structure, or a combination of the indicated data structures.

In at least one embodiment, the host manager 240 manages access to the data 238. The host manager 240 in one embodiment is an application or software agent executing on an instance and/or application server programmed to manage tasks such as software deployment and data store operations, as well as monitoring a state of the data 238 and/or the respective host instance. The host manager 240 in one embodiment listens on a port that can only be reached from the internal system components, and it may not be available to customers or other outside entities. The host manager 240 can be responsible for managing and/or performing tasks such as setting up the instances for a new repository, including setting up logical volumes and file systems, installing database binaries and seeds, and starting or stopping a host 236. The host manager 240 can monitor the health of the data 238, as well as monitoring the data 238 for error conditions such as I/O errors or data storage errors, and can restart the associated data store if necessary. The host manager 240 can also perform and/or mange the installation of software patches and upgrades for the data store and/or operating system. The host manager 240 also can collect relevant metrics, such as may relate to CPU, memory, and I/O usage.

As described, the control plane validation subsystem 220 includes the configuration proposal API 230 that receives API requests from the API repository 208. One or more of the requests received from the API repository 208 can include a parameter for one or more resources of the data plane resources 206. Furthermore, the one or more requests received from the API repository 208 can identify an operation that when executed processes the parameter for the one or more resources of the data plane resources 206. In at least one embodiment, the parameter is to update or otherwise modify one or more resources of the data plane resources 206. In at least one embodiment, the parameter can identify an instruction to add a host to the data plane resources 206, remove a host from the data plane resources 206, create a cluster in the data plane resources 206, modify a cluster of the data plane resources 206, create or modify an availability zone of the data plane resources 206, create or modify a container (e.g., a replica container) of the data plane resources 206, and so forth. In general, the parameter can identify an instruction to add, configure, or otherwise modify one or more computing resources of the data plane resources 206.

In at least one embodiment, the configuration proposal API 230 processes the API requests from the API repository 208 by executing one or more operations identified by the API requests to cause the operations identified by the API requests to process one or more parameters associated with those API requests. As indicated, the one or more operations identified by the API requests can be stored in the subsystem storage 222. The configuration proposal API 230, by processing the API requests from the API repository 208, updates the data plane configuration data structure 232 based on the one or more parameters associated with the API requests. Specifically, the configuration data of the data plane configuration data structure 232 can be updated by the configuration proposal API 230 to comprise a modified configuration data. This modified configuration data can reflect that the data plane resources 206 are to be updated to include a new host, remove a host, create a cluster, modify a cluster, create or modify an availability zone, create or modify a container (e.g., a replica container), and so forth.

The control plane validation subsystem 220 can use the configuration proposal API 230 to process an associated API call that compares the modified configuration data of the data plane configuration data structure 232 to a constraint data structure 244 that includes constraint data for the data plane 204. The constraint data included in the constraint data structure 244 can include rules pertaining to modifying or otherwise changing computing resources of the data plane 204, such as the data plane resources 206. For example, the rules pertaining to modifying or otherwise changing computing resources of the data plane 204 can include rules specifying the number of hosts (e.g., a minimum number of hosts and/or a maximum number of hosts) that can be included in the data plane 204, rules for modifying the hosts of the data plane 204, rules for adding hosts to the data plane 204, rules for deleting hosts of the data plane 204, rules associated with clusters of the data plane 204, partitioning rules of the data plane 204, rules associated with availability zones of the data plane 204, rules associated with replica nodes of the data plane 204, rules associated with a hash space and/or a hash chunk space of the data plane 204, rules for routers of the data plane 204, and so forth. In general, the constraint data structure 244 can be used by the control plane validation subsystem 220 to determine if proposed changes to the data plane resources 206 can be implemented by the data plane 204. If the proposed changes violate the rules of the constraint data structure 244, the control plane validation subsystem 220 can block propagation of the proposed changes to the data plane resources 206. Furthermore, if the proposed changes violate the rules of the constraint data structure 244, the control plane validation subsystem 220 can generate and convey a message to a user or operator that comprises information indicating that the proposed changes have not been made to the data plane resources 206. The information can also include a summary of the one or more rules, comprised in the constraint data structure 244, violated by the proposed changes for the data plane resources 206 of the data plane 204.

In at least one embodiment, the control plane validation subsystem 220, in concert with the configuration proposal API 230, can use the constraint data included in the constraint data structure 244 to determine when the modified configuration data of the data plane configuration data structure 232 conflicts with the constraint data of the constraint data structure 244. As indicated, when the modified configuration data of the data plane configuration data structure 232 conflicts (i.e., violates) with the constraint data of the constraint data structure 244, the control plane validation subsystem 220 can generate a message indicating that the requested changes to the data plane 204 and/or its data plane resources 206 do not comply with the constraint data included in the constraint data structure 244, and the updates to the configuration of the data plane 204, based on one or more parameters of the API request processed by the configuration proposal API 230, are rejected. However, when the modified configuration data of the data plane configuration data structure 232 does not conflict with the constraint data of the constraint data structure 244, the control plane validation subsystem 220 can allow updating the configuration of the data plane 204 and/or the data plane resources 206 based on one or more parameters of the one or more API requests processed by the configuration proposal API 230. In an example, the control plane validation subsystem 220 can use a persist API 246 to update the configuration of the data plane 204 and/or the data plane resources 206 based on the one or more parameters and associated identified operations of the one or more API requests to update the data plane 204 and/or the data plane resources 206. In at least one embodiment, the persist API 246 can update version data associated with a log file or other data hosted by the control plane validation subsystem 220 and/or the control plane 202 to indicate a data plane configuration data structure 232, comprising modified configuration data validated based on the constraint data structure 244, is the most recent approved version, such as the "official" version, for the data plane configuration data structure 232.

In at least one embodiment, as indicated in the foregoing, the control plane validation subsystem 220 can use the constraint data included in the constraint data structure 244 to determine when the updated configuration data of the data plane configuration data structure 232 conflicts with the constraint data of the constraint data structure 244. When the updated configuration data conflicts with the constraint data, the control plane validation subsystem 220 can reject the proposed updates to the configuration of the data plane 204, associated one or more API requests processed by the configuration proposal API 230. In at least one embodiment, the updated configuration data of the data plane configuration data structure 232 is rolled back, through functionality of the control plane validation subsystem 220, so that the configuration data of the data plane configuration data structure 232 no longer includes the configuration data updates caused by processing the one or more API requests obtained by the configuration proposal API 230. Conversely, when the updated configuration data of the data plane configuration data structure 232 does not conflict with or complies with the constraint data of the constraint data structure 244, the persist API 246, in concert with the control plane validation subsystem 220, can use the updated configuration data of the data plane configuration data structure 232 to generate instructions that can be conveyed to the data plane 204 and that instruct the data plane 204 to update its data plane resources 206 based on the updated configuration data of the data plane configuration data structure 232.

In at least one embodiment, the host manager 240 can poll the control plane validation subsystem 222 determine if an updated data plane configuration data structure 232 has been approved by the control plane validation subsystem 220 based on the constraint data structure 244. When an updated data plane configuration data structure 232 has been approved by the control plane validation subsystem 220, such as determined by referring to a version number of the data plane configuration data structure 232, the host manager 240 can analyze the data plane configuration data structure 232 to update the data plane resources 206 based on the updated data plane configuration data structure 232. In at least one embodiment, the host manager 240 can analyze the data plane configuration data structure 232 to determine new and/or updated one or more nodes and/or vertices connecting the one or more nodes included in the updated data plane configuration data structure 232. The host manager 240 can use the determined new and/or updated one or more nodes and/or vertices as the basis to update the data plane resources 206. For example, the new and/or updated one or more nodes and/or vertices of the updated data plane configuration data structure 232 can indicate that the data plane resources 206 are to be updated to include a modified host, a new host, a new availability zone, a modified availability zone, a modified one or more replicas, a new replica, and so forth. Therefore, the host manager 240 can use the determined new and/or updated one or more nodes and/vertices, associated with the data plane configuration data structure 232, to update the data plane resources 206 of the data plane 204.

Figure 3:
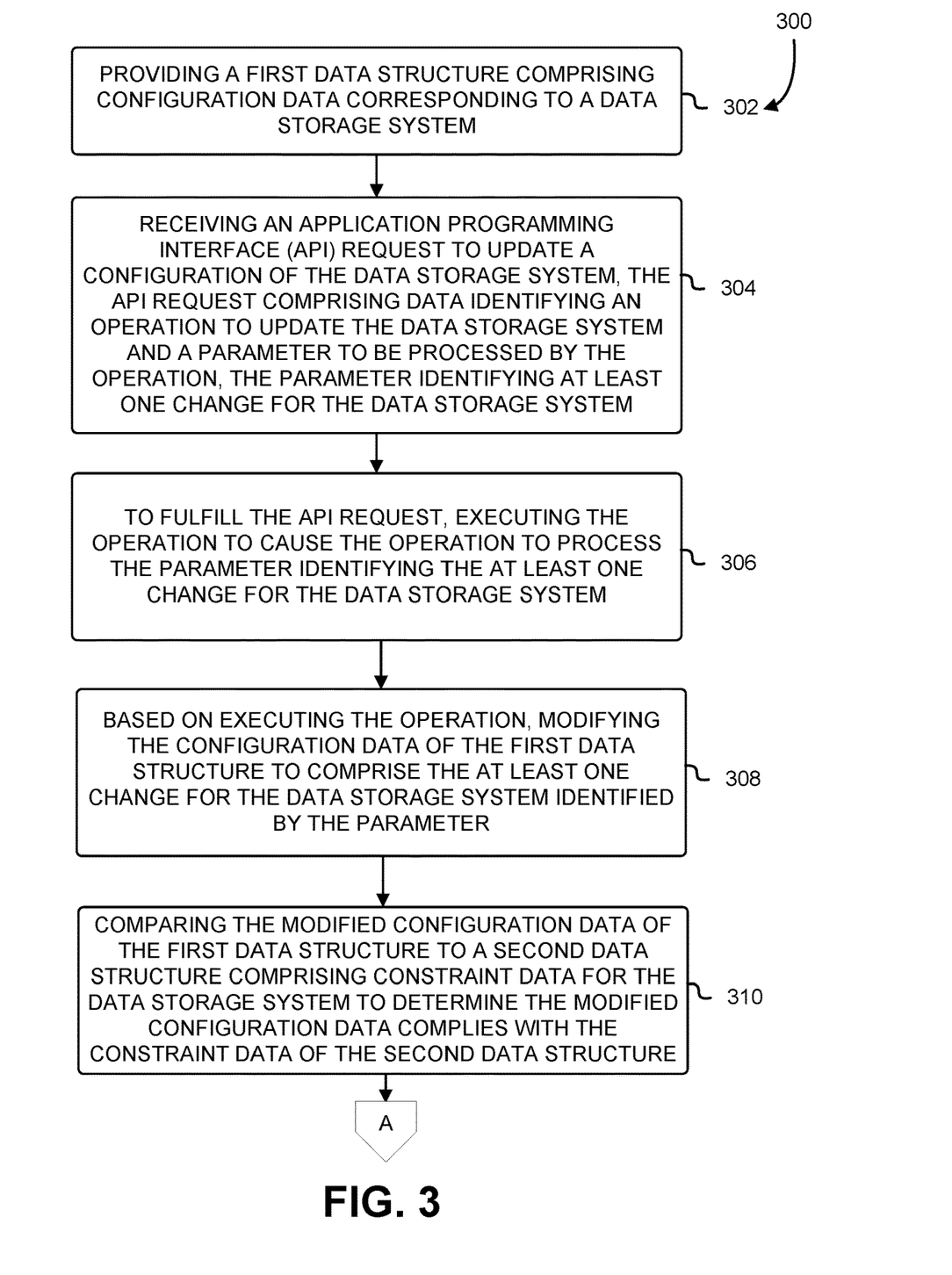
FIG. 3 illustrates a flow diagram including various processing acts, implemented by a system environment with one or more computing devices, related to processing proposed updates for a data storage system, according to at least one embodiment.
Figure 4:
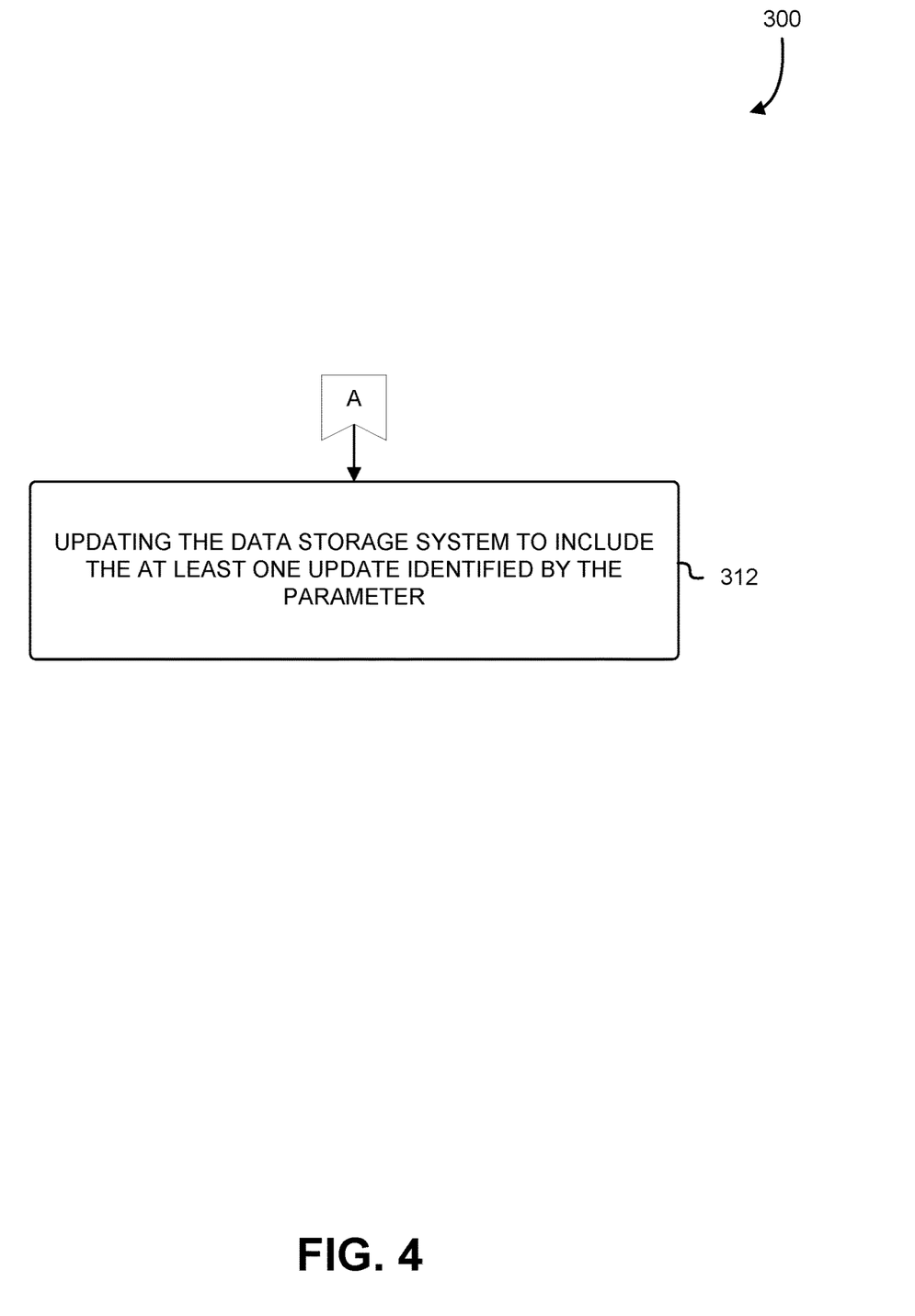
FIG. 4 illustrates a continuation of flow diagram of FIG. 3 including various processing acts, implemented by a system environment with one or more computing devices, related to processing proposed updates for a data storage system, according to at least one embodiment.

FIGS. 3 and 4 illustrate a flow diagram 300 including various processing acts, implemented by a system environment with one or more computing devices, related to processing proposed updates for a data storage system, according to at least one embodiment. In some implementations, the acts of the flow diagram 300 are executed by one or more computing devices illustrated in FIGS. 1-2 and 7. The illustrated computing devices can execute computer-executable instructions incorporating at least some of the processing acts of the flow diagram 300.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer readable instructions included on a computer storage media. The term "computer readable instructions," and variants thereof, as used in the description and claims, is used expansively herein to include routines, applications, application modules, program modules, system modules, programs, components, data structures, algorithms, and the like. Computer readable instructions can be implemented on various system configurations, including single processor or multiprocessor systems, minicomputers, mainframe computers, distributed computer systems, personal computers, handheld computing devices, microprocessor based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 302, a first data structure comprising configuration data corresponding to a data storage system is provided. In at least one embodiment, the first data structure corresponds to the first data structure 114 of the environment 100. In at least one embodiment, the first data structure corresponds to the data plane configuration data structure 232 of the environment 200.

At 304, an application programming interface (API) request is received to update a configuration of the data storage system, the API request comprising data identifying an operation to update the data storage system and a parameter to be processed by the operation, the parameter identifying at least one change for the data storage system. In at least one embodiment, the request corresponds to the request including the operation identifier 110 and the one or more parameters 112. In at least one embodiment, the request corresponds to one or more API requests received by the control plane validation subsystem 220 and/or the configuration proposal API 230.

At 306, to fulfill the API request, execute the operation to cause the operation to process the parameter identifying the at least one change for the data storage system. In at least one embodiment, the second computing resource 104 of the environment 100 executes the operation. In at least one embodiment, the control plane validation subsystem 220 of the environment 200 executes the operation.

At 308, based on executing the operation, modify the configuration data of the first data structure to comprise the at least one change for the data storage system identified by the parameter. In at least one embodiment, the configuration data of the first data structure 114 is modified. In at least one embodiment, the configuration data of the data plane configuration data structure 232 is modified.

At 310, the modified configuration data of the first data structure compared to a second data structure comprising constraint data for the data storage system to determine the modified configuration data complies to the constraint data of the second data structure. In at least one embodiment, the comparing process of 310 is performed by the second computing resource and 104. In at least one embodiment, the comparing process of 310 is performed by the control plane validation subsystem 220 and/or the configuration proposal API 230.

At 312, the data storage system is updated to include the at least one update identified by the parameter. In at least one embodiment, the data storage system that is updated is associated with the second computing resource 104. In at least one embodiment, the data system that is updated corresponds to the data plane 204 and/or the data plane resources 206 of the data plane 204. In at least one embodiment, the update identified by the parameter is applied to the data plane configuration data structure 232. The data plane configuration data structure 232 is then used to update the data storage system associated with the second computing resource 104 and/or the data plane 204, and/or the data plane resources 206 of the data plane 204.

Figure 5:
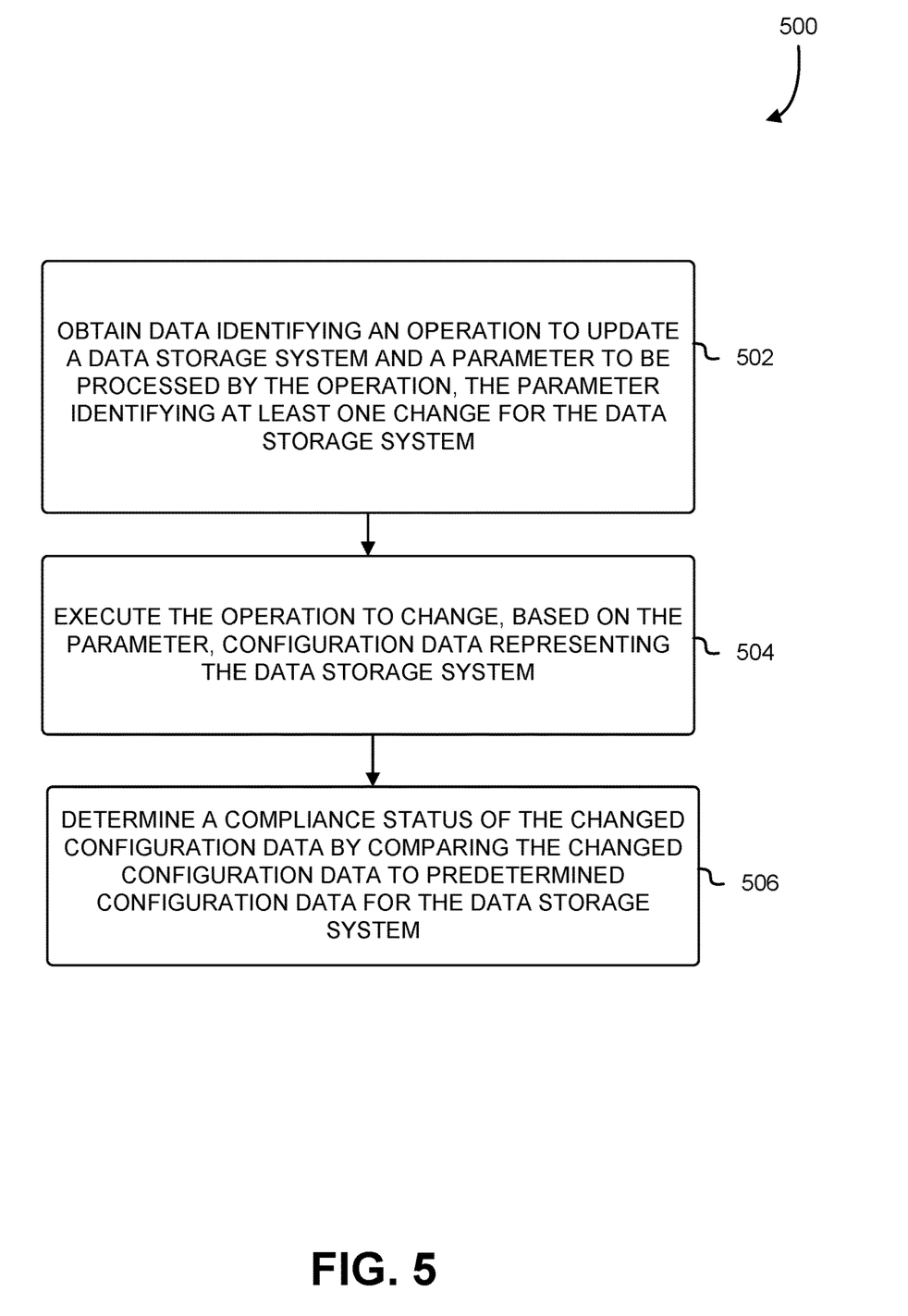
FIG. 5 illustrates another flow diagram including various processing acts, implemented by a system environment with one or more computing devices, related to processing proposed updates for a data storage system, according to at least one embodiment.

FIG. 5 illustrates a flow diagram including various processing acts, implemented by a system environment with one or more computing devices, related to processing proposed updates for a data storage system, according to at least one embodiment.

At 502, data identifying an operation to update a data storage system and a parameter are obtained to be processed by the operation, the parameter identifying at least one change for the data storage system. In at least one embodiment, the data and the parameter are associated with a request including the operation identifier 110 and the one or more parameters 112. In at least one embodiment, the data and the one or more parameters are associated with one or more API requests from the API repository 208.

At 504, the operation is executed to change, based on at least one parameter, configuration data representing the data storage system. In at least one embodiment, the operation is executed to change configuration data associated with the data plane configuration data structure 232. In at least one embodiment, the operation is executed to change configuration data associated with the first data structure 114 including configuration data of a data storage system.

At 506, a compliance status of the changed configuration data is determined by comparing the changed configuration data to predetermined configuration data for the data storage system. In at least one embodiment, the predetermined configuration data for the data storage system is included in the second data structure 116 that includes constraint data for the data storage system. In at least one embodiment, the predetermined configuration data for the data storage system is included in the constraint data structure 244 of the control plane validation subsystem 220. In at least one embodiment, the comparing process of 506 is performed by the second computing resource 104 and/or the control plane validation subsystem 220. In at least one embodiment, the comparing process of 506 is performed by processing the configuration proposal API 230.

Figure 6:
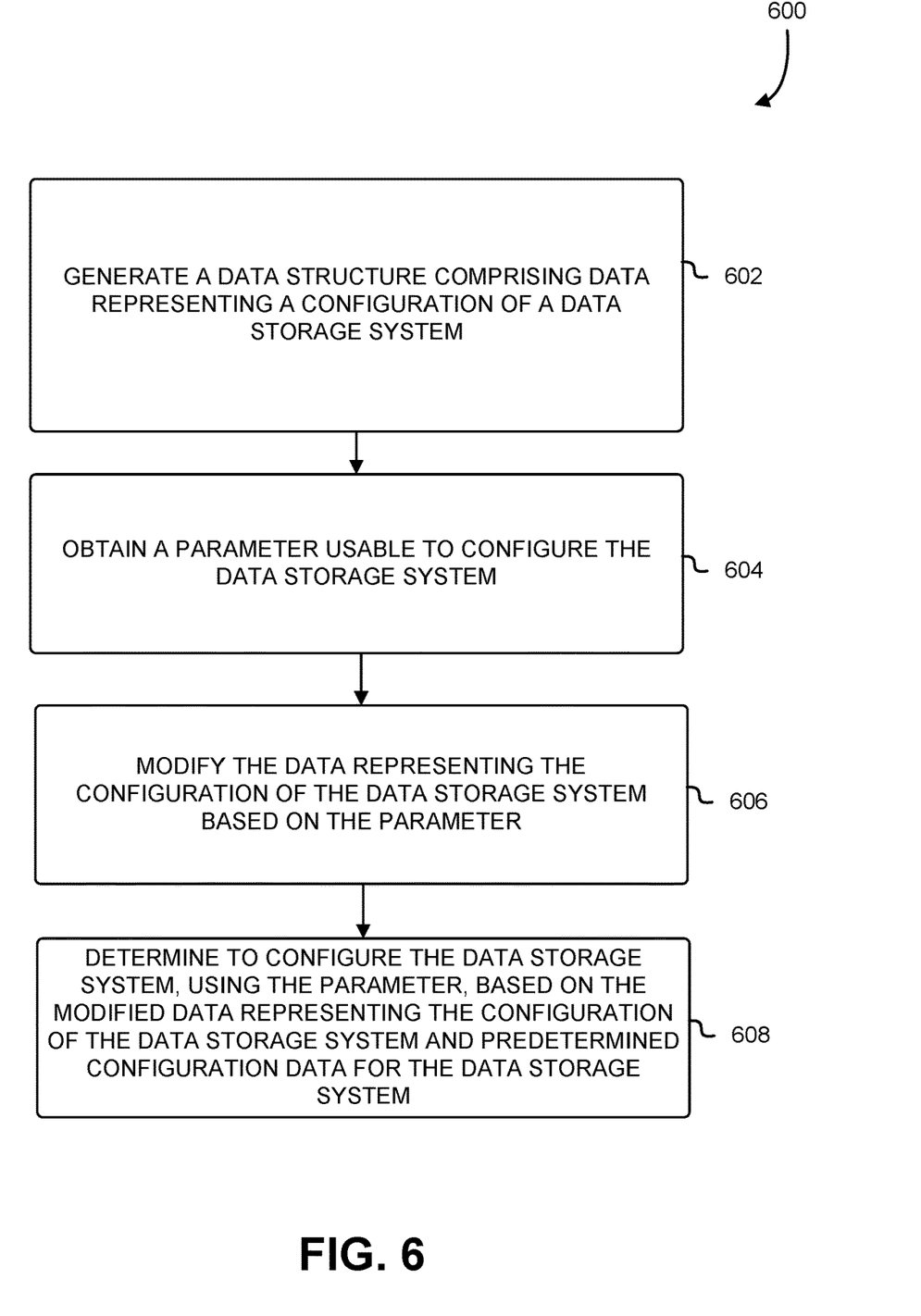
FIG. 6 illustrates another flow diagram including various processing acts, implemented by a system environment with one or more computing devices, related to processing proposed updates for a data storage system, according to at least one embodiment.

FIG. 6 illustrates a flow diagram including various processing acts, implemented by a system environment with one or more computing devices, related to processing proposed updates for a data storage system, according to at least one embodiment.

At 602, a data structure comprising data representing a configuration of a data storage system is generated. In at least one embodiment, the generated data structure comprises the first data structure 114. In at least one embodiment, the generated data structure comprises the data plane configuration data structure 232. In at least one embodiment, the data structure comprising the data representing the configuration of the data storage system is generated based on analyzing computing resources of the second computing resource 104 and/or computing resources of the data plane 204.

At 604, a parameter usable to configure the data storage system is obtained. In at least one embodiment, the parameter is obtained through a request including one or more parameters 112. In at least one embodiment, the parameter is obtained through one or more API requests 210-218 received by the control plane validation subsystem 220.

At 606, the data representing the configuration of the data storage system is modified based on the parameter. In at least one embodiment, the configuration of the data storage system is comprised in data of the first data structure 114. In at least one embodiment, the configuration of the data storage system is comprised in the data plane configuration data structure 232 of the control plane validation subsystem 220.

At 608, it is determined to configure the data storage system, using the parameter, based on the modified data representing the configuration of the data storage system and predetermined configuration data for the data storage system. In at least one embodiment, the modified data representing the configuration of the data storage system is included in the first data structure 114 and/or the data plane configuration data structure 232. In at least one embodiment, the determination to configure the data storage system is performed by the second computing resource 104 and/or the control plane validation subsystem 220. In at least one embodiment, the determination to configure the data storage system is performed by the configuration proposal API 230 of the control plane validation subsystem 220.

Figure 7:
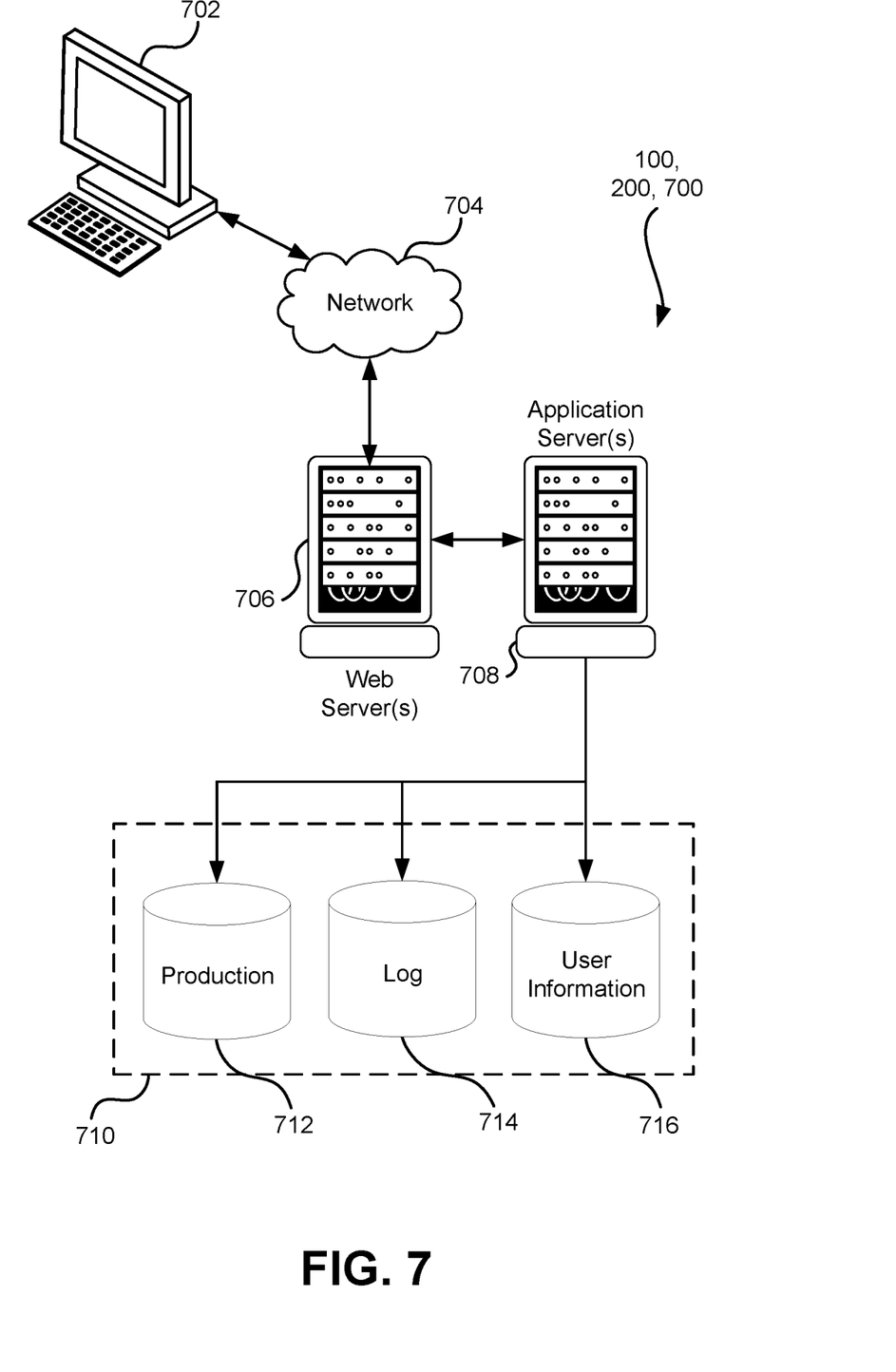
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PUP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C#or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
providing a first data structure comprising configuration data corresponding to a data storage system;
receiving an application programming interface (API) request to update a configuration of the data storage system, the API request comprising data identifying an operation to update the data storage system and a parameter to be processed by the operation, the parameter identifying at least one change for the data storage system;
to fulfill the API request, executing the operation to cause the operation to process the parameter identifying the at least one change for the data storage system;
based on executing the operation, modifying the configuration data of the first data structure to comprise the at least one change for the data storage system identified by the parameter;
comparing the modified configuration data of the first data structure to a second data structure comprising constraint data for the data storage system to determine the modified configuration data complies with the constraint data of the second data structure; and
updating the data storage system to include the at least one change for the data storage system identified by the parameter.

2. The computer-implemented method according to claim 1, wherein the configuration data corresponding to the data storage system, comprised in the first data structure, identifies at least computing resources of the data storage system, and wherein the first data structure comprising the configuration data is a graph data structure comprising at least one or more nodes representing the computing resources and configuration information associated with the computing resources.

3. The computer-implemented method according to claim 1, wherein the data identifying the operation to configure the data storage system comprises a plurality of operations, each of the plurality of operations comprising at least one operation to configure the data storage system, and wherein the plurality of operations is associated with a workflow initiated to configure the data storage system.

4. The computer-implemented method according to claim 1, wherein the constraint data comprised in the second data structure comprises predetermined configuration data for a storage cluster topology associated with the data storage system, the predetermined configuration data comprising at least a maximum number of host computing resources allowed for the storage cluster topology and a condition that the storage cluster topology is allocated a range of hash addresses.

5. A system, comprising:
one or more processors; and
memory that stores computer-executable instructions that are executable by the one or more processors to cause the system to:
obtain data identifying an operation to update a data storage system and a parameter to be processed by the operation, the parameter identifying at least one change for the data storage system;
execute the operation to change, based on the parameter, configuration data representing the data storage system;
determine a compliance status of the changed configuration data by comparing the changed configuration data to predetermined configuration data for the data storage system; and
based on the determined compliance status, generate a response indicating the compliance status of the at least one change for the data storage system.

6. The system according to claim 5, wherein the data identifying the operation to configure the data storage system and the parameter to be processed by the operation are comprised in an application programming interface (API) automatically generated based on analysis of the configuration data representing the data storage system.

7. The system according to claim 5, wherein the configuration data representing the data storage system is comprised in a data structure, the data structure and the configuration data associated therewith generated based on analysis of computing resources allocated to the data storage system.

8. The system according to claim 5, wherein the predetermined configuration data for the data storage system is comprised in a data structure, the predetermined configuration data comprises one or more parameters to constrain modification of the data storage system.

9. The system according to claim 5, wherein the memory that stores the computer-executable instructions that are executable by the one or more processors are further to cause the system to:
based on the determined compliance status, configure the data storage system according to the parameter identifying the at least one change for the data storage system.

10. The system according to claim 5, wherein the memory that stores the computer-executable instructions that are executable by the one or more processors are further to cause the system to:
based on the determined compliance status, generate a response indicating the at least one change for the data storage system fails to comply with the predetermined configuration data for the data storage system.

11. The system according to claim 5, wherein the configuration data representing the data storage system is comprised in a graph data structure, the graph data structure and the configuration data associated therewith generated based on analysis of computing resources allocated to the data storage system.

12. The system according to claim 5, wherein the data storage system comprises a control plane and a data plane, the control plane to manage one or more computing resources of the data plane, and wherein the computer-executable instructions that are executable by the one or more processors are hosted by the control plane of the data storage system.

13. A system, comprising:
one or more processors; and
memory that stores computer-executable instructions that are executable by the one or more processors to cause the system to:
generate a data structure comprising data representing a configuration of a data storage system;
obtain a parameter usable to configure the data storage system;
modify the data representing the configuration of the data storage system based on the parameter; and
determine to configure the data storage system, using the parameter, based on the modified data representing the configuration of the data storage system and predetermined configuration data for the data storage system.

14. The system according to claim 13, wherein obtaining the parameter usable to configure the data storage system comprises receiving a programmatic request comprising the parameter and an identifier of an operation to process the parameter.

15. The system according to claim 14, wherein modifying the data representing the configuration of the data storage system based on the parameter comprises executing the operation to process the parameter to cause the modification of the data representing the configuration of the data storage system.

16. The system according to claim 13, wherein the memory that stores the computer-executable instructions that are executable by the one or more processors are further to cause the system to:
analyze computing resources of the data storage system to generate the data structure comprising the data representing the configuration of the data storage system, and wherein the data structure comprising the data representing the configuration of the data storage system is a graph data structure.

17. The system according to claim 13, wherein the data storage system comprises a control plane and a data plane, the control plane to manage one or more computing resources of the data plane, and wherein the computer-executable instructions that are executable by the one or more processors are hosted by the control plane of the data storage system.

18. The system according to claim 13, wherein the predetermined configuration data for the data storage system is comprised in a data structure, the predetermined configuration data comprising parameters to constrain modification of the data storage system.

19. The system according to claim 13, wherein modify the data representing the configuration of the data storage system based on the parameter is performed by an application programming interface (API) call initiated in response to obtaining the parameter usable to configure the data storage system.

20. The system according to claim 13, wherein determining to configure the data storage system comprises confirming the modified data representing the configuration of the data storage system does conflict with the predetermined configuration data for the data storage system.

\* \* \* \* \*